US008332066B2

(12) United States Patent
Weber

(10) Patent No.: US 8,332,066 B2
(45) Date of Patent: Dec. 11, 2012

(54) METHOD AND APPARATUS FOR REMOVING, INSERTING AND SECURING RECEPTACLES IN A RECEPTACLE TRAY

(75) Inventor: Frank Weber, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 13/080,543

(22) Filed: Apr. 5, 2011

(65) Prior Publication Data

US 2011/0180440 A1 Jul. 28, 2011

Related U.S. Application Data

(63) Continuation of application No. 12/029,331, filed on Feb. 11, 2008, now Pat. No. 7,992,746.

(51) Int. Cl.
*G06F 17/00* (2006.01)

(52) U.S. Cl. .................... 700/242; 221/5; 221/7; 221/8; 700/236; 700/237; 700/241

(58) Field of Classification Search .................. 700/236, 700/237, 241, 242; 221/5, 7, 8
See application file for complete search history.

(56) References Cited

U.S. PATENT DOCUMENTS 5,445,294 A 8/1995 Gardner et al.
5,671,592 A 9/1997 Yuyama et al.
5,745,366 A 4/1998 Higham et al.
5,905,653 A 5/1999 Higham et al.
6,011,999 A 1/2000 Holmes et al.
6,116,461 A * 9/2000 Broadfield et al. ............ 221/13
6,636,780 B1 10/2003 Haitin et al.
7,142,944 B2 11/2006 Holmes et al.
7,440,818 B2 * 10/2008 Handfield et al. ............ 700/241
2004/0108795 A1 6/2004 Meek et al.
2004/0225409 A1 11/2004 Duncan et al.

FOREIGN PATENT DOCUMENTS

WO WO 02/38101 5/2002

OTHER PUBLICATIONS

International Search Report mailed Jun. 17, 2009, in International Application No. PCT/US2009/033811.

* cited by examiner

*Primary Examiner* — Timothy Waggoner
(74) *Attorney, Agent, or Firm* — McDermott Will & Emery LLP

(57) ABSTRACT

A method and apparatus for controlling removal of one or more receptacles from a receptacle tray are described herein, in which a removal indicator indicates which of the one or more receptacles to remove. Thereafter, the indicated one or more receptacles may be manually removed from the receptacle tray using a gripping mechanism. The receptacles are secured in the tray with two or more tangs protruding from a front face of the receptacle closest to a connector interface. The two or more tangs fit into respective mating units in the receptacle tray, and one or more protrusions toward the rear of the receptacle, with respect to the two or more tangs, mate with respective mating units in the receptacle tray.

12 Claims, 20 Drawing Sheets

Fig. 10
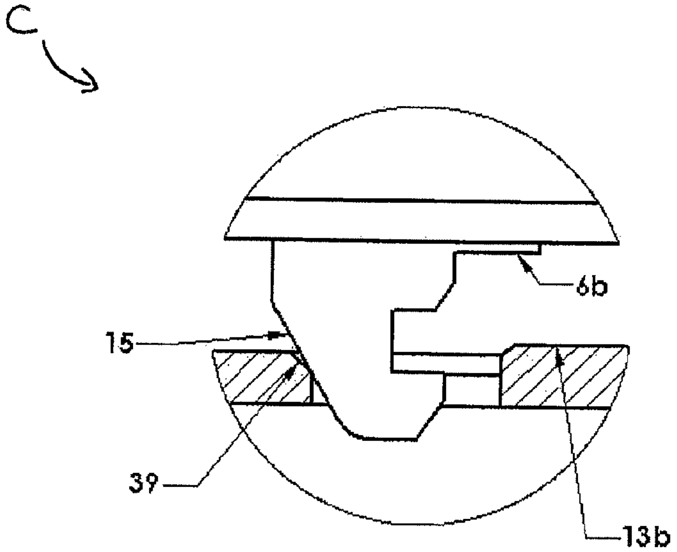
Fig. 11(a)
Fig. 11(b)
Fig. 11(c)
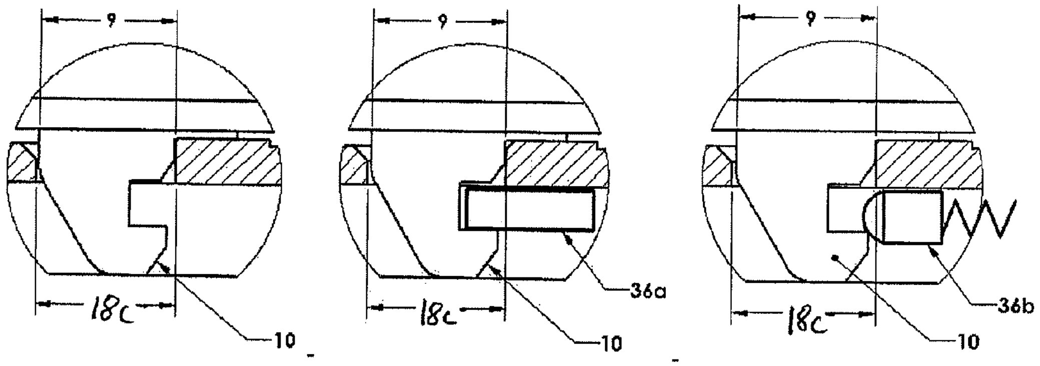

METHOD AND APPARATUS FOR REMOVING, INSERTING AND SECURING RECEPTACLES IN A RECEPTACLE TRAY

This application is a continuation of U.S. application Ser. No. 12/029,331, filed Feb. 11, 2008, now issued as U.S. Pat. No. 7,992,746, which is incorporated herein by reference in its entirety.

FIELD

The present disclosure relates generally to the reliable storage and distribution of items, such as drugs, and more particularly, a method and apparatus for storing, transporting, receiving, refilling, and tracking drugs through their channels of distribution.

BACKGROUND

It is known in the art to dispense drugs at a healthcare location or other care facility through an automated dispensing machine using pockets (or "receptacles") within drawers for later removal and administration by doctors and nursing staff. Specific uses for modular receptacles, having a bottom and a plurality of sides and an attached top that may be actuated to open to expose the contents of the receptacle, have been described in U.S. Pat. Nos. 6,116,461 and 6,338,007, for example. The receptacle may include an information storage device, such as a memory chip, for storing information regarding the contents of the receptacle. The systems described by these patents utilize modular receptacles that are presented for removal by "popping" the receptacles up from the system drawer. The mechanism used for popping is relatively complicated, with significant tolerance stack-up issues, leading to the receptacles sometimes not popping when they should, or popping at undesired times.

Similarly, U.S. Pat. No. 6,011,999 discloses a system of drawers holding receptacles, each with electronic locks provided to secure respective lids of the receptacles. A processor communicates with the locks to actuate the lids, which are spring biased, such that the lids pop open when directed.

U.S. Pat. No. 5,905,653, for example, discusses the use of visual indicators providing a cue to a user as to which lid on a receptacle to open or which medication to remove for distribution to patients. The system described in this patent uses immovable bins that are not transportable or easily reconfigurable. Thus, the visual indicator does not tell the user which receptacle to remove or reconfigure.

SUMMARY

The presently disclosed embodiments are directed to solving one or more of the problems presented in the prior art, described above, as well as providing additional features that will become readily apparent by reference to the following detailed description when taken in conjunction with the accompanying drawings.

One or more preferred embodiments are directed to a method for controlling removal of one or more receptacles from a receptacle tray. The method comprises indicating, using a removal indicator, which of the one or more receptacles to remove, and manually removing the indicated one or more receptacles from the receptacle tray.

One or more embodiments may include simultaneously unlatching a plurality of the one or more receptacles including one or more of the indicated one or more receptacles to be manually removed from the receptacle tray, by energizing a motor to drive a latch element in an unlatch direction to unlatch a plurality of the one or more receptacles; determining whether one or more of the indicated one or more receptacles remains for removal; and if none of the indicated one or more receptacles remains for removal, energizing the motor to drive the latch element in a latch direction One or more preferred embodiments provide an apparatus for controlling removal of one or more receptacles from a receptacle tray, using a removal indicator indicating which of the one or more receptacles to manually remove from the receptacle tray.

Certain embodiments are directed to an apparatus for securing one or more receptacles while allowing for easy insertion of the receptacle(s) into a mating tray. The apparatus comprises a receptacle tray having a plurality of mating units, and at least one receptacle with two or more tangs protruding from a front face of the receptacle closest to a connector interface, where two of the two or more tangs are configured to mate with respective mating units in the receptacle tray. Each receptacle further includes one or more protrusions, toward a rear direction of the receptacle with respect to the two or more tangs, which are configured to mate with respective mating units in the receptacle tray. Contacting ramp features of the receptacle tray may be used to cause the tangs to engage mating features of the tray.

Embodiments are directed to an apparatus for securing one or more receptacles in a receptacle tray, where the receptacle tray includes a retaining mechanism that engages hooks of a plurality of receptacles simultaneously, and the retaining mechanism includes: a motor driving a latch element in an unlatch direction; an indicator indicating where to place a receptacle; a processor determining whether one or more receptacles remains to be placed in the receptacle tray, wherein if no receptacles remain to be placed in the receptacle tray, and energizing the motor to drive the latch element in a latch direction.

Cooperating mechanical features of the receptacles and trays give a reliable means for inserting receptacles into trays and provide exceptionally accurate control of the relative position of the receptacle within the tray, particularly in the vicinity of the connector interface, resulting in a reliable electrical connection.

As will become evident by the following Description and Drawings, by indicating which receptacles to remove and manually removing the indicated receptacles via a gripping mechanism, a consistent and reliable electrical connection between the receptacle and the tray will be maintained over a longer period of time, while providing the capability of easily reconfiguring the receptacles and securely transporting items with the receptacles.

Of course, the present invention is not limited to the aforementioned embodiments, and other features of the embodiments will become apparent after review of the hereinafter set forth Brief Description of the Drawings, Detailed Description, and the Claims, or may be learned by practice of the invention.

BRIEF DESCRIPTION OF THE DRAWINGS

The foregoing aspects of the embodiments described herein will become more readily apparent by reference to the following detailed description when taken in conjunction with the accompanying drawings wherein:

FIG. 10 is a close up view of element C showing a hook ramp feature engaging an edge of a hole in a receptacle tray, according to certain embodiments disclosed.

FIGS. 11(*a*), 11(*b*) and 11(*c*) show a close up view of element D showing alternative means for holding down a receptacle in a receptacle tray, according to certain embodiments disclosed.

DETAILED DESCRIPTION

Figure 1:
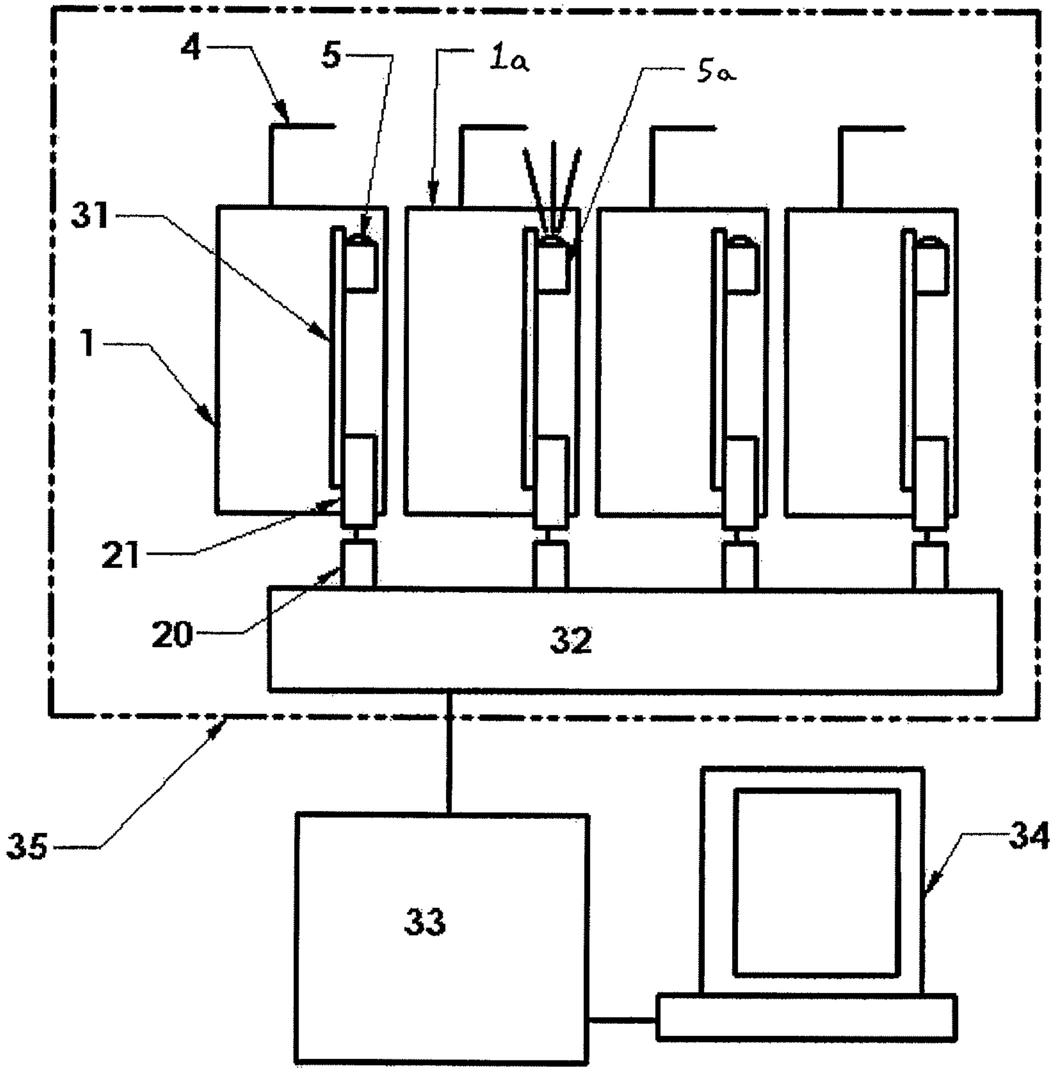
FIG. 1 is a schematic showing a plurality of receptacles in a tray assembly, according to certain embodiments disclosed.

Reference will now be made in detail to the presently disclosed embodiments, examples of which are illustrated in the accompanying drawings, wherein like reference numerals refer to like elements throughout.

FIG. 1 shows a schematic of one example of a receptacle tray assembly 35 holding a plurality of receptacles 1. It is noted, however, that the disclosed embodiments are not limited to any particular number of receptacles within the receptacle tray assembly 35. The tray assembly 35 may be integrated into a drawer (not shown) which is part of a medication dispensing cabinet (not shown), for example, but may alternatively be part of any system involved in holding modular receptacles.

Referring now to FIG. 1, in this example, the receptacles 1 are each connected to an electric circuit 31, in connection with a removal indicator 5 and a connector 21. In the illustrated embodiment, the removal indicator 5 is an illuminator, however, other indicating mechanisms may be used without departing from the scope of the claimed invention. The tray assembly 35 includes an electric receptacle tray circuit 32, with one or more connectors 20 that provide electrical continuity to the connectors 21 of the receptacles 1.

Receptacles 1 as described herein require a reliable electrical connection to a receptacle tray 2 for various purposes, including: secure control of receptacle lid unlatching; storage and retrieval of information in the receptacle circuit; and control of the receptacle locating illuminator.

In the schematic shown in FIG. 1, a user may request to remove a receptacle 1 through a user interface 34. The interface 34 may be any conventional interface, such as a touch screen, keypad, keyboard, point and click device, etc. The removal request may specify the known location of the receptacle 1 to be removed or the request may be for some receptacle 1 of unknown location containing a specified item or medication. In this example, processor 33 (e.g., a computer) receives the removal request and determines the location of the requested receptacle 1, or specified item or medication. Processor 33 may additionally determine whether the user has the authority to remove the requested receptacle 1, or specified item or medication. If the user has authorization, the processor 33 instructs the receptacle tray circuit 32 to light the an illuminator 5, for example, corresponding to the receptacle 1, which was requested or contains the specified item or medication. In this case, the receptacle 1 to be indicated is shown at reference numeral 1*a* and the lighted illuminator is specified as reference numeral 5*a*. The receptacle tray circuit 32 may supply power to the illuminator 5*a* directly though the appropriate receptacle connector 21, or it may send a signal to the receptacle circuit 31 instructing it to power the illuminator.

The user removes the illuminated receptacle 1*a* using a gripping feature 4 on the receptacle 1*a*. In the embodiments depicted in FIG. 1, the gripping feature 4 is a hook-like handle protruding from the body of each receptacle 1; however, the disclosed embodiments are not limited to this specific type of gripping mechanisms, and various other gripping mechanisms may be used.

Figure 2:
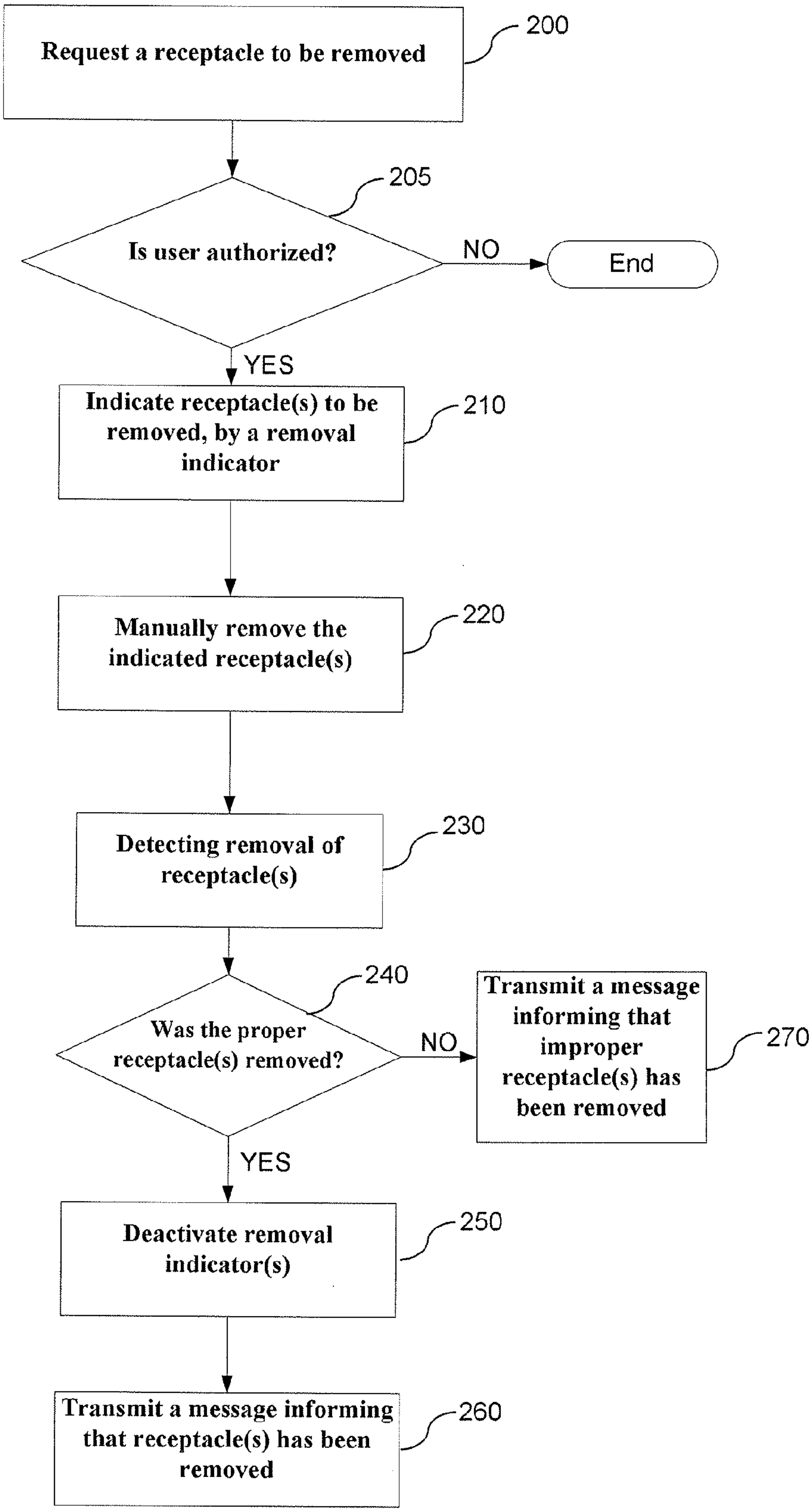
FIG. 2 is a flowchart showing a method for controlling removal of one or more receptacles from a receptacle tray, according to certain embodiments disclosed.

FIG. 2 is a flowchart illustrating an exemplary method for controlling removal of one or more receptacles from a receptacle tray, according to certain embodiments disclosed. At step 200, a request is made by a user at the user interface 34, for example, specifying either the known location of the one or more receptacles 1 to be removed or one or more items/medications within the one or more receptacles 1 to be removed. This request is for removal of one or more receptacles 1, indicated by removal indicator 5.

In certain embodiments, processor 33 determines whether the user has the authority to remove the specified receptacle(s) 1 at step 205. If it is determined that the user is authorized to remove the requested receptacle 1, only then does the process proceed to step 210, where the receptacle(s) 1 to be removed are indicated. If the user is not authorized to remove the specified receptacle(s) 1, then the process is terminated.

At step 210 the one or more receptacles 1 to be removed are indicated using a removal indicator 5, such as an illuminator 5. Here, the processor 33 receives the user request of operation 200 and determines the location of the desired receptacle(s) 1. The processor 33 instructs the receptacle tray circuit 32 to activate the removal indicator 5, which may supply power to the removal indicator 5 directly through the receptacle connector 21 or may send a signal to the receptacle tray circuit 32 to cause it to power the removal indicator 5.

Figure 3:
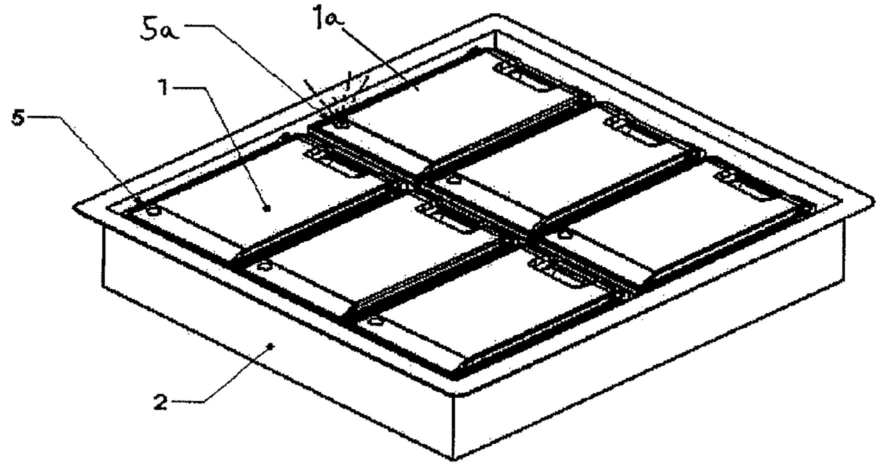
FIG. 3 is a schematic showing a plurality of receptacles in a receptacle tray, according to certain embodiments disclosed.
Figure 5:
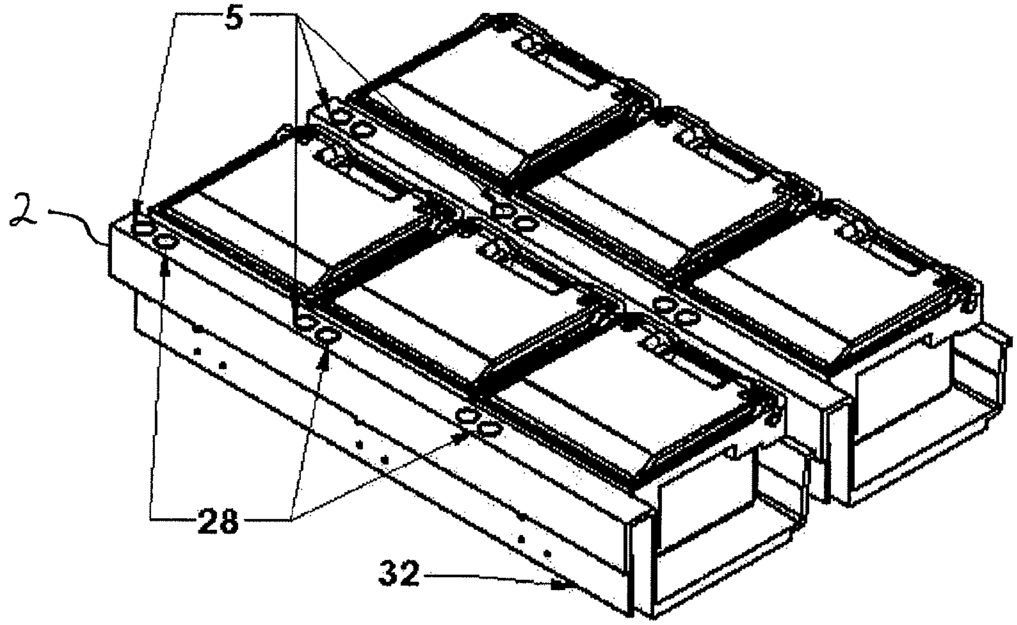
FIG. 5 is a schematic showing an alternative placement of a removal indicator, according to certain embodiments disclosed.

As described above, the removal indicator 5 may be an illuminator 5 connected to the receptacle(s) 1 to be removed. For example, FIG. 3 shows one possible arrangement of receptacles 1 in a receptacle tray 2. The illuminator 5*a* has been turned on in one of the receptacles 1*a*, indicating which receptacle 1 should be removed by the user. It is noted, however, that the disclosed embodiments are not limited to a specific placement of the removal indicator 5. For example, as an alternative, the removal indicator 5 may be connected directly to the receptacle tray 2, positioned in close proximity to the indicated one or more receptacles 1, as shown in FIG. 5. As seen in FIG. 5, the removal indicators 5 are physically attached to the receptacle tray 2, and may be activated directly by the receptacle tray circuit 32. The removal indicators 5 also may be provided under a clear plastic cover 19 (shown in FIG. 6).

Figure 4:
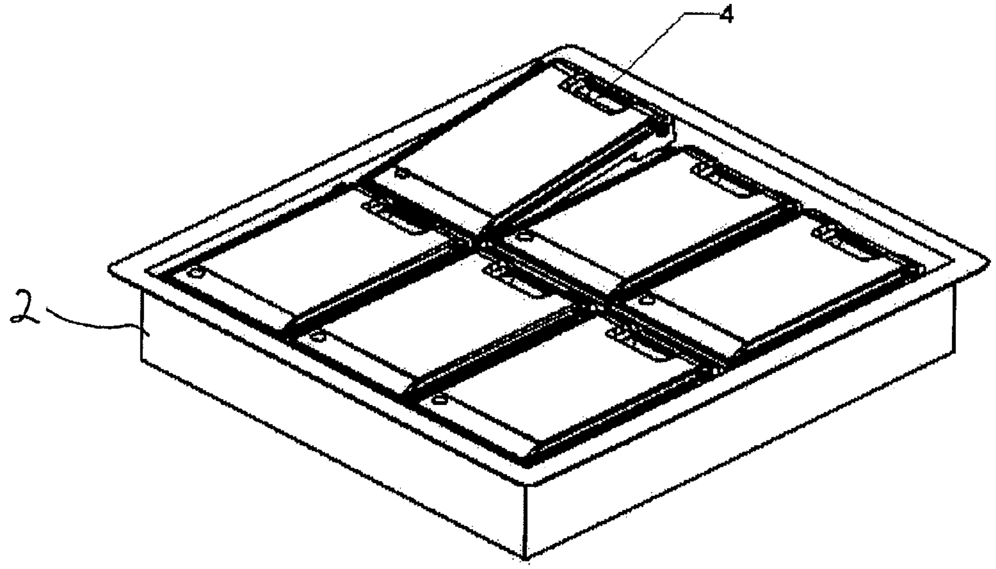
FIG. 4 is a schematic showing a receptacle being removed from a receptacle tray, according to certain embodiments disclosed.

From step 210, the process moves to step 220, where the one or more indicated receptacles 1*a* are manually removed using the gripping mechanism 4. For example, FIG. 4 shows a receptacle 1 being lifted out of the receptacle tray 2 by the user (not shown) pulling up on gripping mechanism 4. As stated above, the gripping mechanism 4 may be a hook-like handle.

Figure 6:
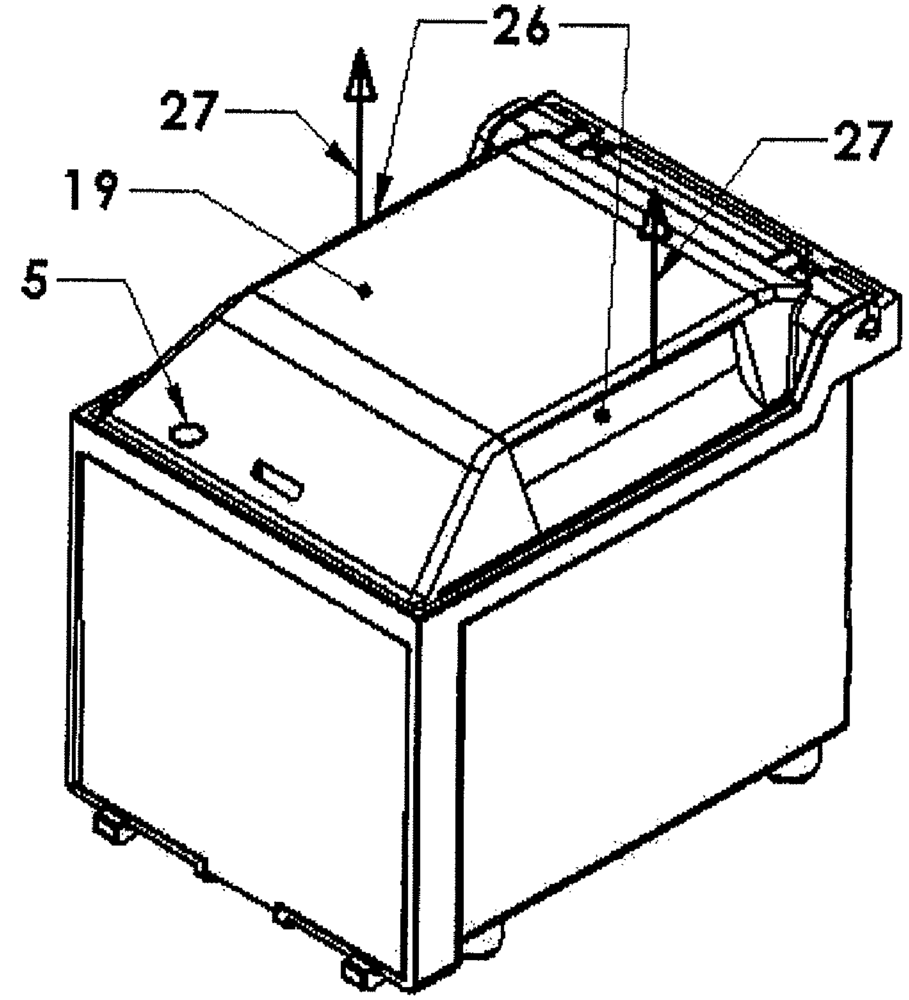
FIG. 6 is a schematic showing an example of a gripping mechanism, according to certain embodiments disclosed.

FIG. 6 depicts an embodiment of a receptacle 1 in isolation. This embodiment has a gripping mechanism 26 for lifting the receptacle 1 out of the receptacle tray 2 in which the user could use the fingers of either one or two hands, depending on the width of the receptacle 1. The user inserts fingers into recesses of gripping mechanism 26, and lifts up in the direction shown by arrows 27.

In certain embodiments, from step 220 the process proceeds to step 230, where the removal of receptacles 1 is detected. The receptacle tray circuit 32 detects the removal of a receptacle 1 by the loss of electrical continuity between the receptacle tray circuit 32 and the receptacle circuit 31.

From step 230, the process moves to step 240, where it is determined whether the proper receptacles 1*a* (i.e., the indicated receptacles) were removed. If, in fact, the receptacle(s) 1*a* that is removed, as detected by the receptacle tray circuit 32, is the receptacle(s) 1*a* that was indicated at step 210, then the process proceeds to step 250 and the receptacle tray circuit 32 deactivates the removal indicator 5*a*. Several methods may be employed by the receptacle tray circuit 32 to detect when one or more receptacles 1*a* are removed. As a first example, a multiplexing circuit can detect directly the location of a connector that is disconnected. As a second example, each receptacle 1*a* may have a unique ID, and a circuit can interrogate each receptacle 1*a* to see which one is missing without actually having to know the location. Of course, these types of circuits are merely exemplary, and one of ordinary skill in the art would realize that other methods may be employed using the receptacle tray circuit 32 in order to detect removal of a receptacle 1*a* without departing from the scope of the claimed invention.

The process may proceed to step 260, where the receptacle tray circuit 32 sends a message to the processor 33 informing the processor 33 that the receptacle(s) 1*a* has been removed.

In the case where the user has removed one or more receptacles 1 that have not been approved for removal, then the process proceeds to step 270. The removal is sensed by the receptacle tray circuit 32, and a message is sent to the processor 33. The processor 33 can perform various operations in this case, including recording this variance in a log file (for tracking security exceptions) and sending a message to the user to replace the improperly removed receptacle 1. In addition, at step 280, one or more indicators 5 on receptacles 1 or the receptacle tray 2 may turn on or flash on and off in the case that the user removed the wrong receptacle(s) 1 (i.e., receptacle(s) that were not indicated for removal) to indicate the location(s) of the improperly removed receptacle(s) 1. The disclosed embodiments are not limited to illuminators turning on or flashing on and off to signal the removal of the wrong receptacle(s) 1, and one skilled in the art would realize that various indicating methods could be used to provide equivalent features, such as audible indications, or other visual indicators.

Figure 7A:
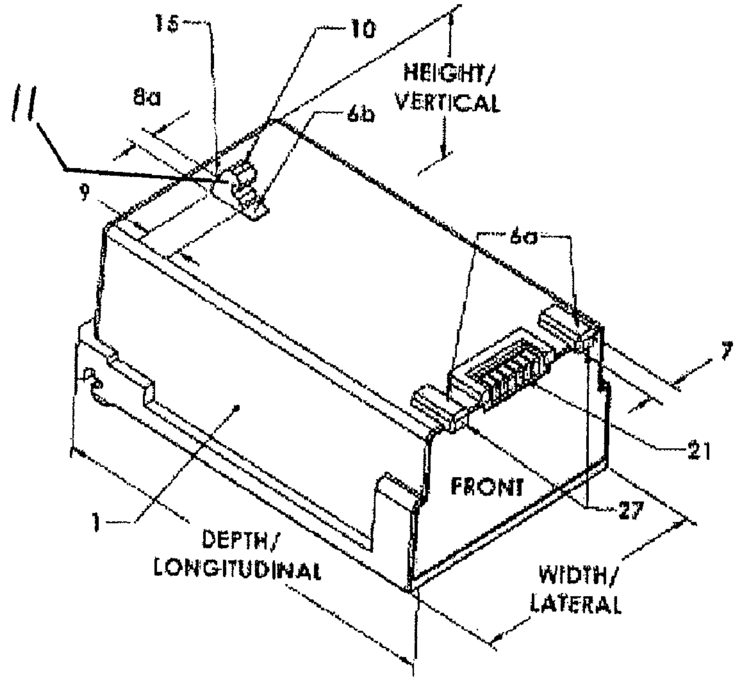
FIGS. 7(*a*) and 7(*b*) are bottom and top isometric views of a receptacle, respectively, according to certain embodiments disclosed.
Figure 7B:
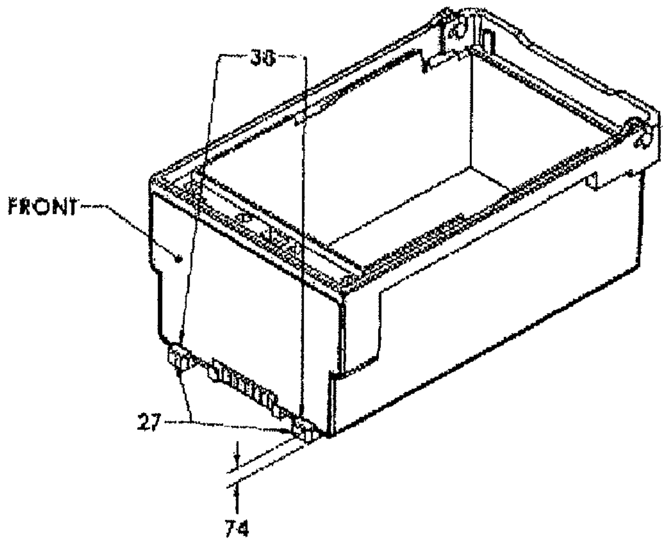

FIG. 7(*a*) is a bottom isometric view of a receptacle 1, according to certain embodiments disclosed. Two tangs 27 protrude outwardly beyond a front face (i.e., the face closest to the connector 21, in certain embodiments). The terms front and hack are used for present explanatory purposes to indicate a relationship to connector(s), and are not to be limiting in terms of spatial orientation. It is also noted, that the present invention is not limited to any particular number of tangs 27, even though only 2 are depicted in order to constrain the receptacle 1 in the receptacle tray 2. The receptacle 1 includes two reference surfaces 6*a* for vertical positioning near the front of the receptacle. In the illustrated embodiment, the reference surfaces 6*a* are the bottom surfaces of the two tangs 27; however, other surfaces near the front of the receptacle 1 could alternately be used.

FIG. 7(*b*) is a top isometric view of a receptacle 1 showing the top retaining surfaces 38 of the tangs 27. The depth 74 of top retaining surfaces 38 is closely controlled relative to the reference surfaces 6*a* in order to provide sufficient position control.

Referring back to FIG. 7(*a*), the bottom of the receptacle 1 includes a protrusion 11 provided near the back of the receptacle 1, with a closely controlled depth dimension 9, thereby acting as a longitudinal position control mechanism. The bottom of the receptacle 1 further includes at least one back vertical reference surface 6*b*, which may or may not include a hook 10. This back vertical reference surface 6*b* is associated with the protrusion 11 in certain embodiments. The protrusion 11 in the depicted embodiment also includes a ramp 15 providing a guiding surface that pushes the receptacle forward, as it is moved down into the receptacle tray 2, to insert the tangs 27 into a corresponding mating feature in the receptacle tray 2 (described below). The tang width 7 of at least one of the tangs 27 is closely controlled, thereby acting as a front lateral control mechanism. The width 8*a* of protrusion 11 forms a secondary, back lateral reference.

Figure 8A:
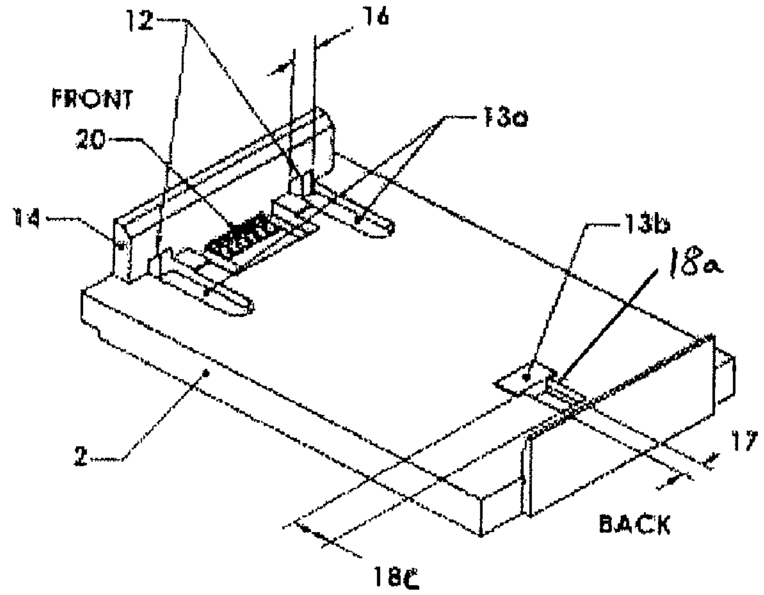
FIGS. 8(*a*) and 8(*b*) are isometric views of a portion of a receptacle tray that interfaces with a receptacle, according to certain embodiments disclosed.
Figure 8B:
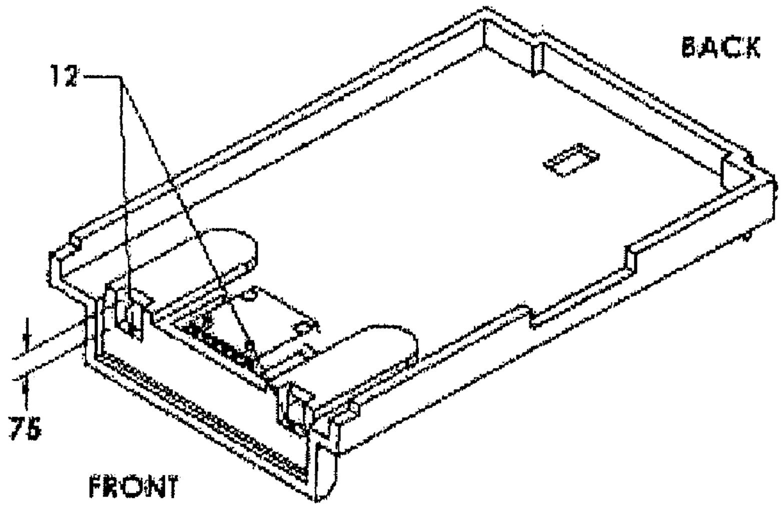

FIG. 8(*a*) is a top isometric view of a portion of a receptacle tray 2 that interfaces with the receptacle 1, according to certain embodiments. A front guide 14 guides the receptacle tangs 27 into the mating tray features during receptacle insertion. Reference surfaces 13*a*, which are controlled relative to vertical reference surfaces 12 mate with reference surfaces 6*a* for vertical positioning of the front of the receptacle(s) 1. It is noted that maintaining secure vertical positioning near the contact 21 of the receptacle 1 is essential for providing a reliable electrical connection to the receptacle tray 2 for various purposes. Embodiments are not limited to any particular number of reference surfaces 13*a*, but the number of reference surfaces 13*a* corresponds to the number of reference surfaces 6*a*. Reference surface 13*b* interfaces with the back vertical reference surface 6*b* of the receptacle 1. Reference surface 13*b* is shown as a raised boss, but other configurations may be employed. Longitudinal mating feature 18*a* interfaces with protrusion 11, where closely controlled depth dimension 9 fits securely with the width 18*c* of longitudinal mating feature 18*a*, in order to maintain longitudinal control of the receptacle 1 in the receptacle tray 2. Closely controlled lateral dimensions 16 and 17 correspond to the closely controlled tang width 7 and the width 8*a* of the back protrusion 11 of the receptacle 1 in order to maintain lateral control of the receptacle 1 in the receptacle tray 2. It is noted that maintaining secure vertical positioning near the contact 21 of the receptacle 1 is essential for providing a reliable electrical connection to the receptacle tray 2 for various purposes.

FIG. 8(*b*) is a bottom isometric view of a portion of the receptacle tray 2, according to aspects of the disclosure. The depth 75 of the vertical reference surfaces 12 is closely controlled relative to the depth 74 of the tangs 27 in order to provide accurate vertical position control of the receptacle 1 within the receptacle tray 2. This arrangement of mating features provides unique and accurate positioning of the contacts 21 and 20 of the receptacle 1 and receptacle tray 2, respectively, by fully constraining the receptacle 1 without over-constraints that could cause binding or increase tolerances.

Figure 9A:
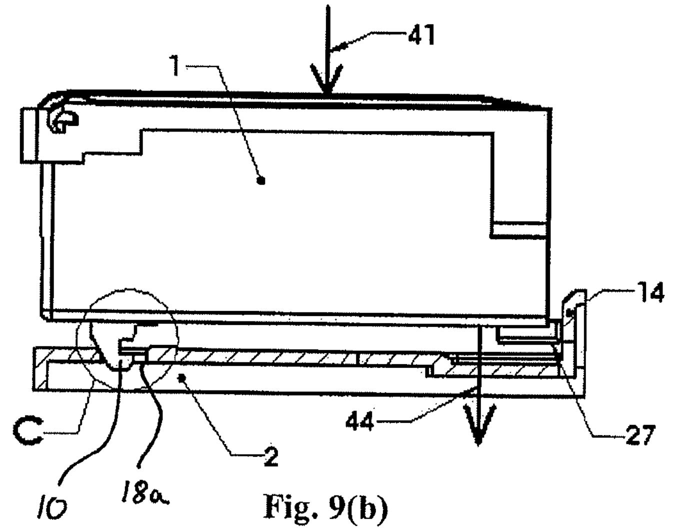
FIGS. 9(*a*), 9(*b*) and 9(*c*) show the interaction between a receptacle and a receptacle tray during receptacle insertion according to certain embodiments disclosed.
Figure 9B:
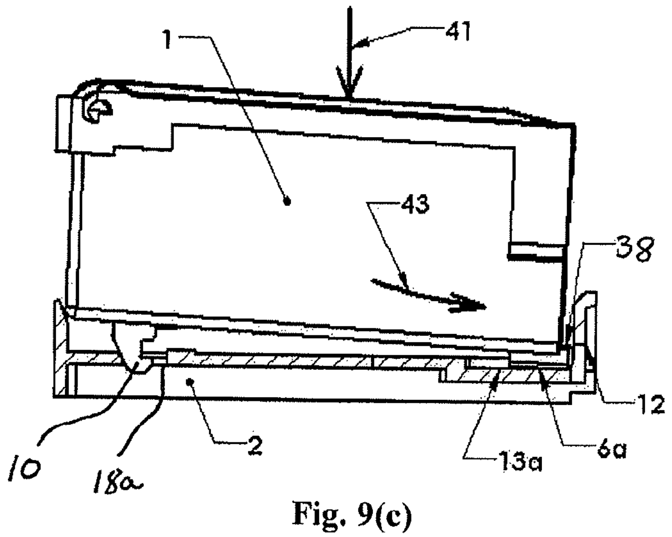
Figure 9C:
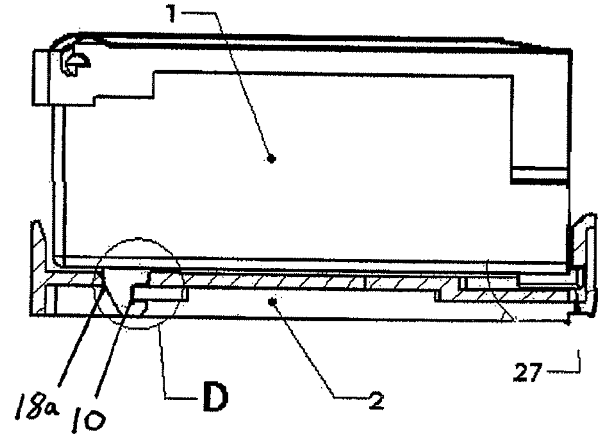

FIGS. 9(*a*), 9(*b*) and 9(*c*) show the interaction between a receptacle 1 and a receptacle tray 2 during receptacle insertion. Referring now to FIG. 9(*a*), the receptacle 1 is shown as it is first placed in the receptacle tray 2 and the user (not shown) starts to push down on the top of the receptacle 1 (illustrated by arrow 41). The hook 10 can not fully insert into the longitudinal mating feature 18*a* in the receptacle tray 2 because the receptacle tang 27 extends beyond the face of the receptacle 1, engaging the front guide 14, causing the ramp 15 to engage the edge 39 of the longitudinal mating feature 18*a* in the receptacle tray 2 (see area C of FIG. 9(*a*), and an enlargement of area C in FIG. 10). As the user pushes down near the center of the receptacle 1, the receptacle 1 moves downwardly in the front (motion illustrated by arrow, 44).

FIG. 9(*b*) shows the receptacle 1 when the front has been pushed all the way down so that the front vertical reference 6*a* of the receptacle 1 bears against the front vertical reference surface 13*a* of the receptacle tray 2. As the user continues to push on the receptacle 1, the ramp 15 begins to slip against the edge 36 of the longitudinal mating feature 18*a*. The receptacle tang 27 slides forward (in a direction shown by arrow 43) so that the top 38 of the receptacle tang 27 seats under the vertical reference surface 12 of the receptacle tray 2.

FIG. 9(*c*) shows the receptacle in a fully seated condition, with area D shown enlarged in different embodiments in FIGS. 11(*a*)-11(*c*). These figures illustrate the manner in which the protrusion 11 with closely controlled depth dimension 9 fits into the longitudinal mating feature 18*a*, with width 18*c*, so as to provide accurate longitudinal position control of the receptacle 1 with respect to the receptacle tray 2. This arrangement of tangs with ramp(s) provides easy receptacle 1 insertion while maintaining the required accurate positional constraints.

FIGS. 11(*a*)-11(*c*) show a plurality of alternative close-up views of area D, according to various embodiments. The receptacle 1 may be only held down by its own weight, with no latch, as shown in FIG. 11(*a*). There may be a positive latch 36*a* that engages the hook 10 to hold the receptacle 1 positively from being removed, as shown in FIG. 11(*b*), or there may be a biased detent 36*b* that provides a resistance against removal, as shown in FIG. 11(*c*). Other mechanisms are employed in different embodiments.

Figure 12:
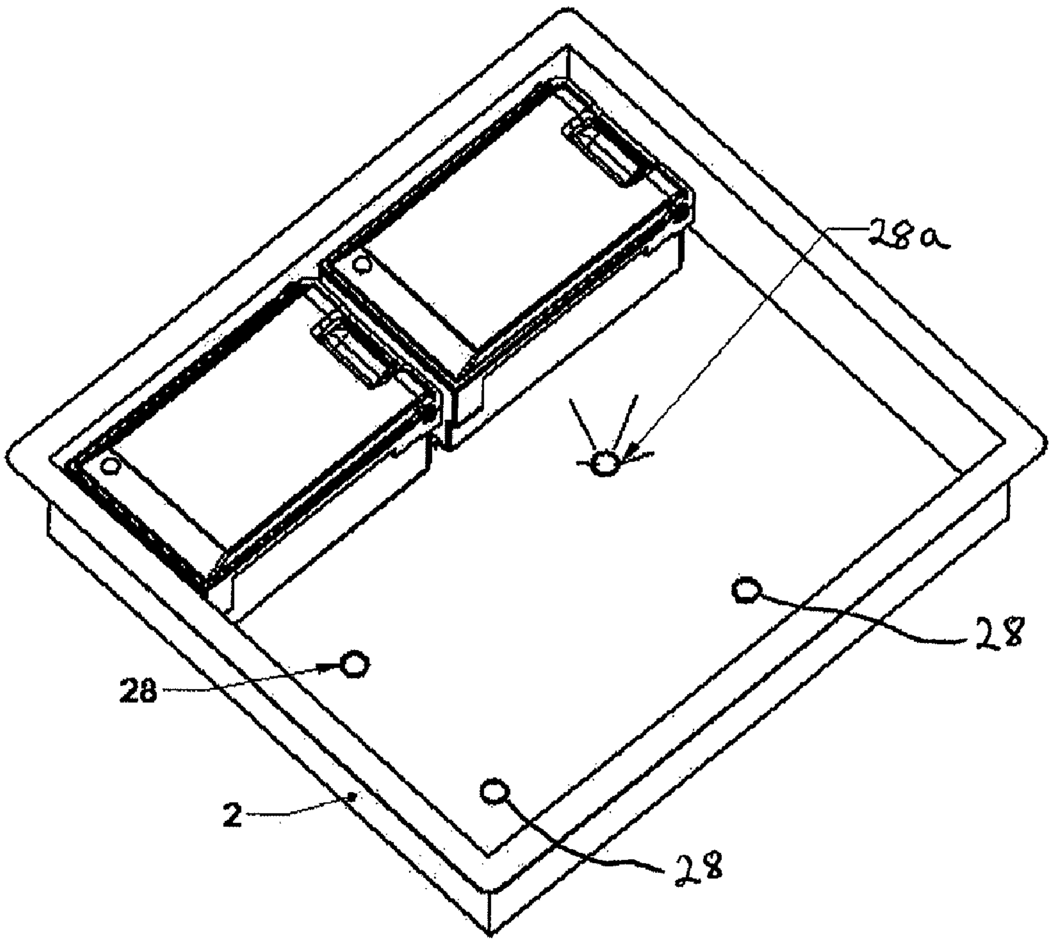
FIG. 12 shows insertion placement indicators in a tray at possible receptacle locations, according to certain embodiments disclosed.

FIG. 12 shows a possible embodiment which includes insertion placement indicators 28 in the receptacle tray 2 at possible receptacle locations. Two receptacles 1 are depicted as being inserted into the receptacle tray 2. These indicators can be activated (shown at reference numeral 28*a*) to guide a user to the proper location to place a receptacle 1 into the tray 2. For example, the appropriate indicators (for example, illuminators) may turn on at the locations where the receptacle(s) 1 are to be placed, or to indicate where an erroneously removed receptacle should be replaced. In FIG. 12, one insertion placement indicator 28 is illustrated for each possible receptacle 1 location; however, it is noted that the present invention is not limited to any particular type or quantity of insertion placement indicators 28.

Figure 13:
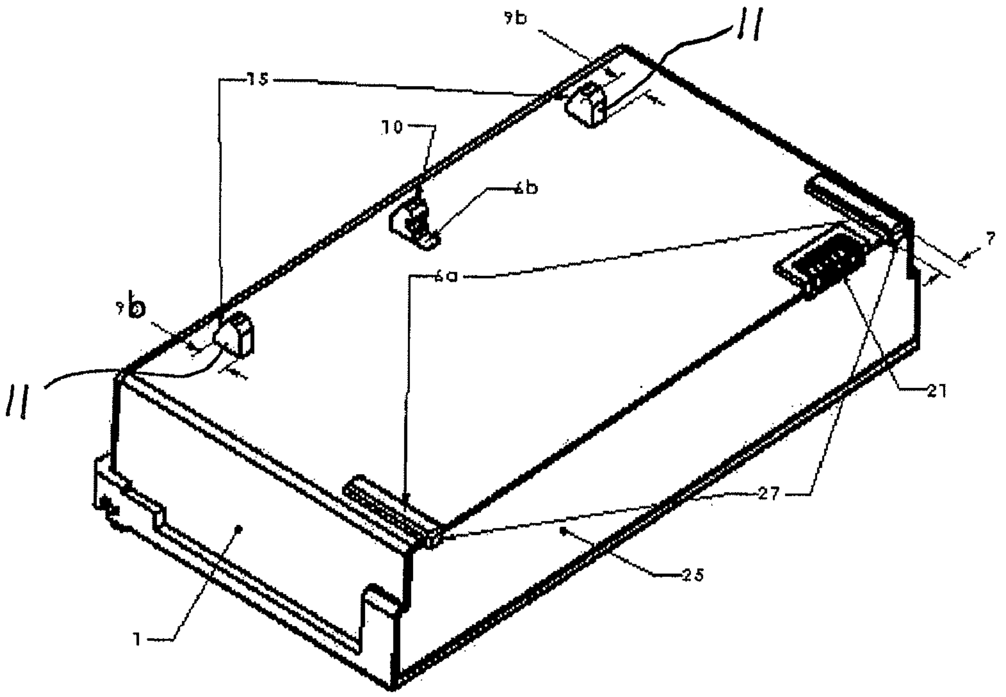
FIG. 13 is an alternative bottom isometric view of a receptacle, according to certain embodiments disclosed.

FIG. 13 depicts an alternative embodiment for securing one or more receptacles 1 in a receptacle tray 2. Two longitudinal controlling protrusions 11 are employed. The hook 10 provides only a retaining function in this embodiment, with clearance on all sides to avoid over-constraint. The vertical reference surface 6*b* is near the center of the receptacle 1, and near the hook 10. Only one of the receptacle tangs 27 serves as a lateral reference 7, near electrical contact 21, towards the front of receptacle 1 is employed. A second lateral reference could over-constrain the location of the receptacle 1, resulting in possible binding or requiring a looser, less accurate lateral location. Two ramps 15 are provided, especially for wide receptacles 1, to allow independent insertion of the two tangs 27. In this embodiment, the ramps 15 are integrated into the longitudinal controlling protrusions 11 with depth dimensions 9*b*, but could be integrated in some other feature to provide equivalent longitudinal control.

Figure 14:
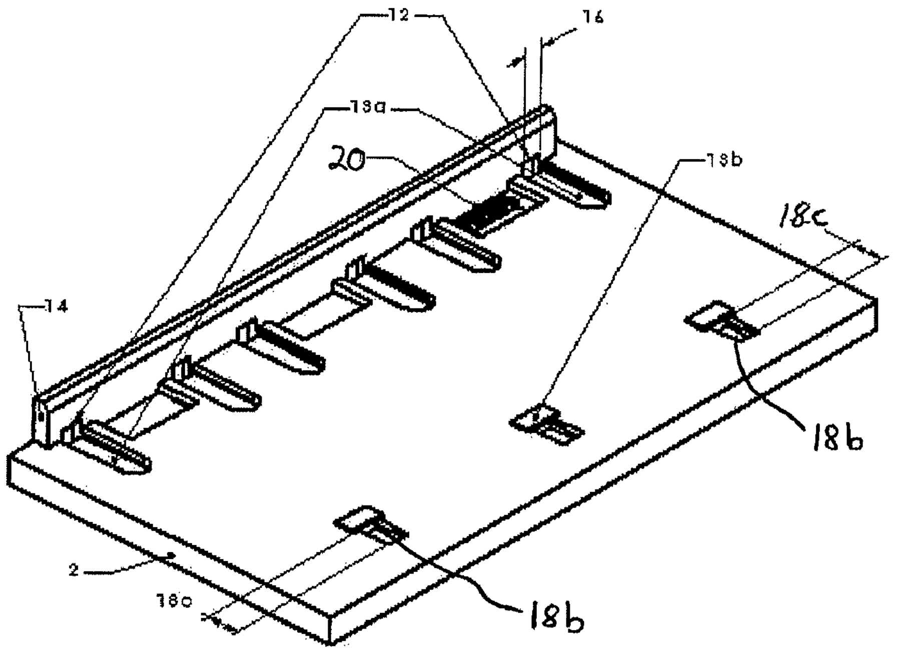
FIG. 14 is an alternative isometric view of a portion of a receptacle tray that interfaces with a receptacle, according to certain embodiments disclosed.

FIG. 14 shows certain features of receptacle tray 2, configured to receive receptacle 1 depicted in FIG. 13, with reference numerals corresponding to those of FIG. 8. Longitudinal reference features 9*b* of receptacle 1 interface with closely controlled longitudinal mating features 18*b* with width 18*c*. Further, reference surface 13*b* interface with mating reference surface 6*b* of receptacle 1.

Figure 15:
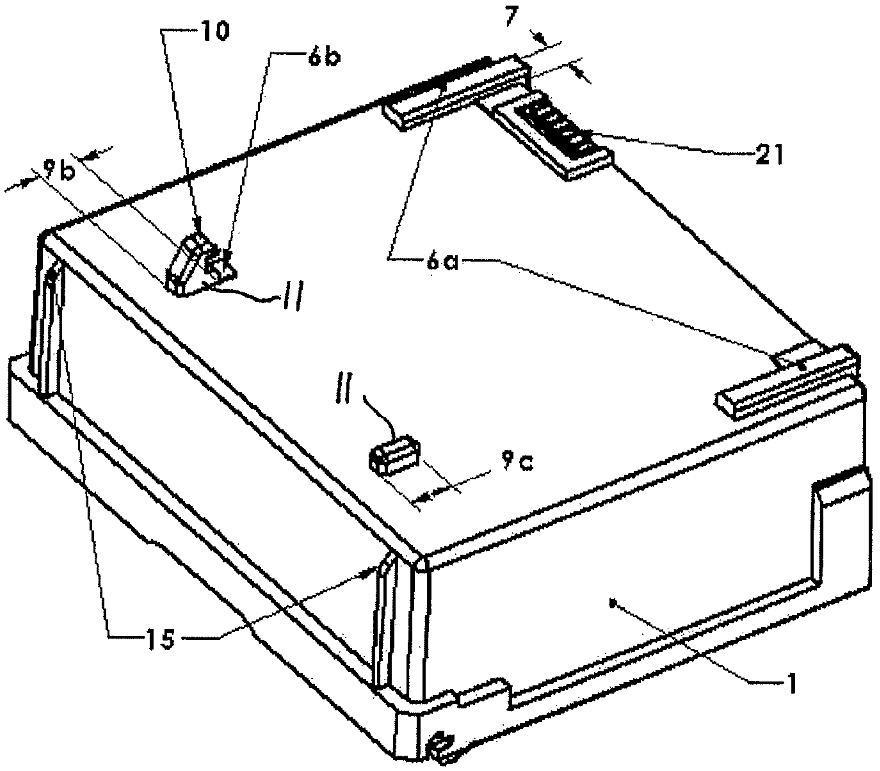
FIG. 15 is an alternative isometric view of a portion of a receptacle tray that interfaces with a receptacle, with a ramp integrated to the back of the receptacle, according to certain embodiments disclosed.

FIG. 15 shows another alternative configuration of a receptacle 1, with reference numerals corresponding to those of FIG. 13. Referring to FIG. 15, the ramps 15 are integrated into the back of the receptacle 1. Further, the hook 10 integrates one protrusion 11 with closely controlled depth dimension 9*b*, and a secondary protrusion 11 with longitudinal control feature 9*c* is shown.

Figure 16:
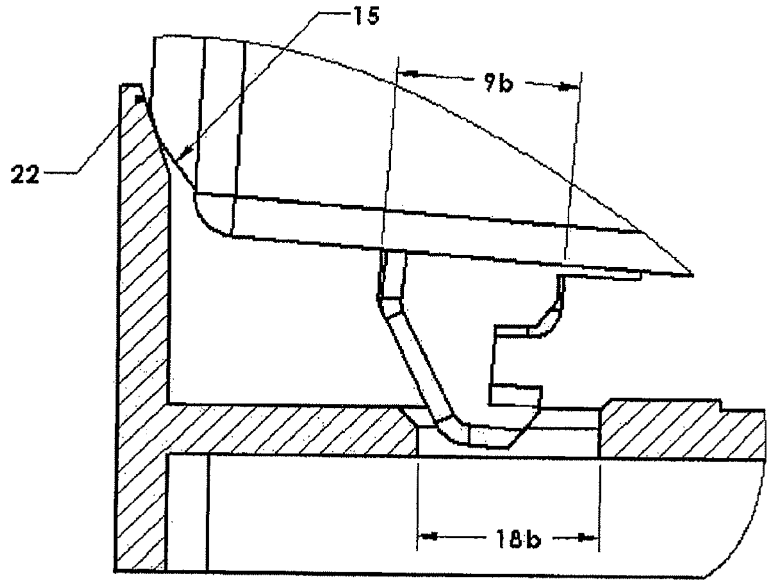
FIG. 16 is shows a back guide feature of a tray to interact with a ramp of a receptacle, according to certain embodiments disclosed.

FIG. 16 shows an optional receptacle 1 engagement scheme whereby an optional ramp 15 of the receptacle 1, illustrated in FIG. 15, interfaces with an optional back guide feature 22 of the receptacle tray 2 to provide an initial interaction that pushes the receptacle tangs 27 forward into engagement with the mating tray features. The depth dimension 9*b* corresponding to width 18*b*, as described with reference to FIGS. 13 and 14, provides further alignment.

Figure 17:
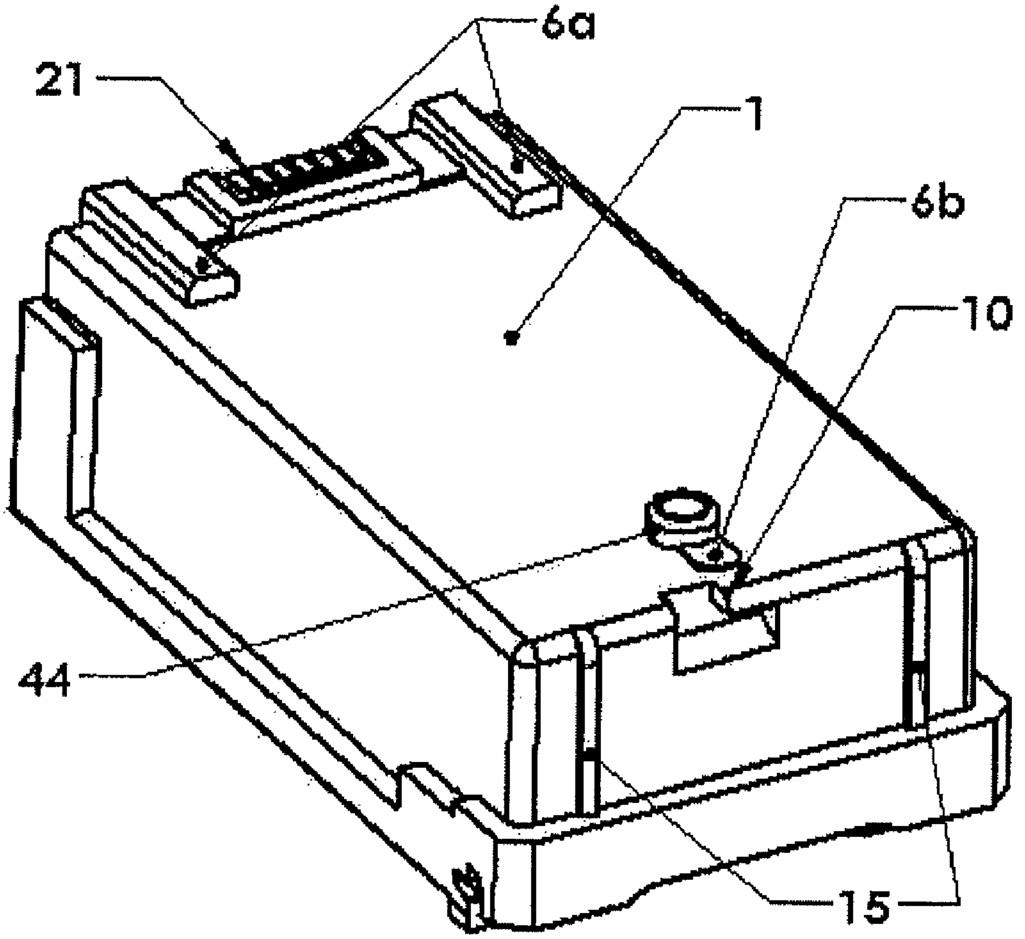
FIG. 17 is an alternative isometric view of a receptacle, with a hook integrated to the back of the receptacle, according to certain embodiments disclosed.

FIG. 17 depicts an alternative configuration of receptacle 1 with a back reference feature 44, hook 10 and ramps 15. The other reference numerals correspond to those depicted in FIG. 7. In this embodiment, the longitudinal and back lateral reference features are combined into a single feature 44. The hook 10 is provided in the back of the receptacle 1 to provide a lower profile envelope.

As discussed earlier, with reference to FIGS. 11(*a*)-(*c*), there are various embodiments for retaining the receptacles 1 in the receptacle tray 2, including being held down by their own weight, being held by a resisting force using a spring detent, or interposing a latch element. In embodiments in which the receptacles 1 are secured using a latch, for example, presently disclosed embodiments are capable of simultaneously latching and unlatching a plurality of receptacles 1.

Figure 18:
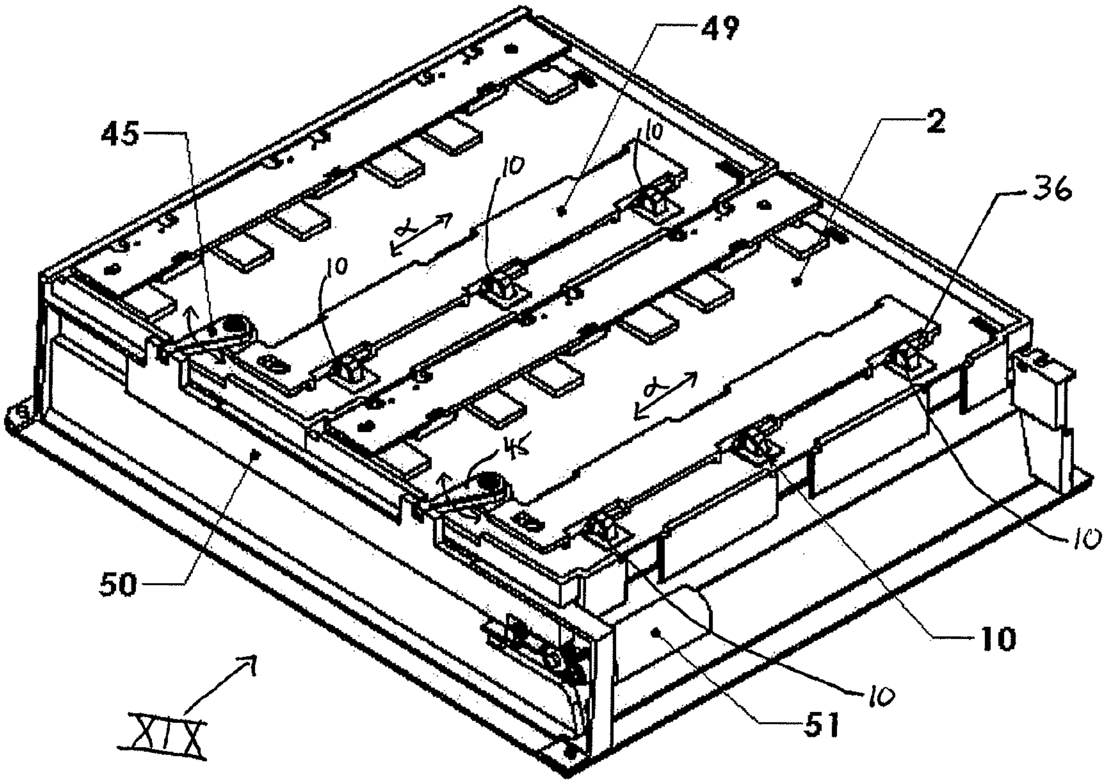
FIG. 18 shows a bottom isometric view of a latch mechanism, according to certain embodiments disclosed.

FIG. 18 shows a bottom isometric view of the latch mechanism of a disclosed embodiment. Portions of FIG. 18 should be considered together with the description of FIG. 19 below. The hooks 10 from multiple receptacles 1 are shown protruding through the bottom of the receptacle tray 2. This example shows three receptacles 1 in one row, as indicated by three hooks 10 protruding through the bottom of the receptacle tray 2; however, it is noted that the disclosed embodiments are not limited to any particular number or receptacles 1 in a given row. Multiple latch sliders 49 slide in a bidirectional manner shown by arrow a to simultaneously engage and disengage latching elements 36 from the hooks 10 in a row by via a motor 51 driving a rod 50 and levers 45.

Figure 19:
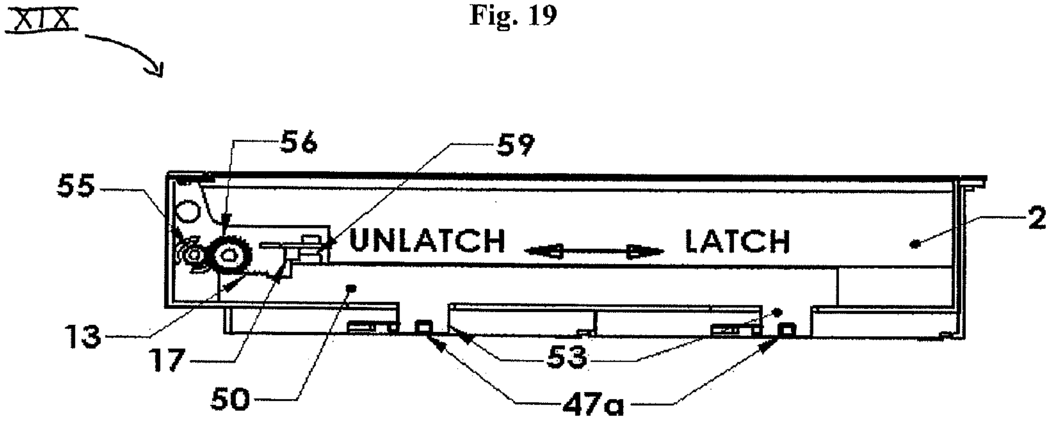
FIG. 19 shows a detailed view of a row latch mechanism, according to certain embodiments disclosed.

FIG. 19 shows a detailed view of side XIX of FIG. 18 when the receptacle tray 2 is face-up, and should be considered with FIG. 18. Side XIX shows the portion of the latch mechanism that is configured to simultaneously latch and unlatch a plurality of receptacles 1. Multiple hooks 10 are engaged by corresponding latching elements 36 (see FIG. 18) of latch sliders 49 (see FIG. 18). The latch sliders 49 are driven by pivoting levers 45, as shown in FIG. 18. A circular portion at the end of the lever 45 engages the sliders 49, thereby driving the sliders 49 left or right, along arrow $\alpha$, to engage or disengage the latch elements 36 from the hooks 10. The rod 50 engages the levers 45 at features 47*a* through slots in yokes 53. The motor 51 drives the rod 50 at the rack segment 13 of the rod 50 through a gear train 55 and 56. The position of the rod 50 is controlled by a sensor assembly 17 that detects the position of the rod 50 via a flag feature 59 attached to the rod 50 (discussed below with reference to FIGS. 20 and 21).

Figure 20:
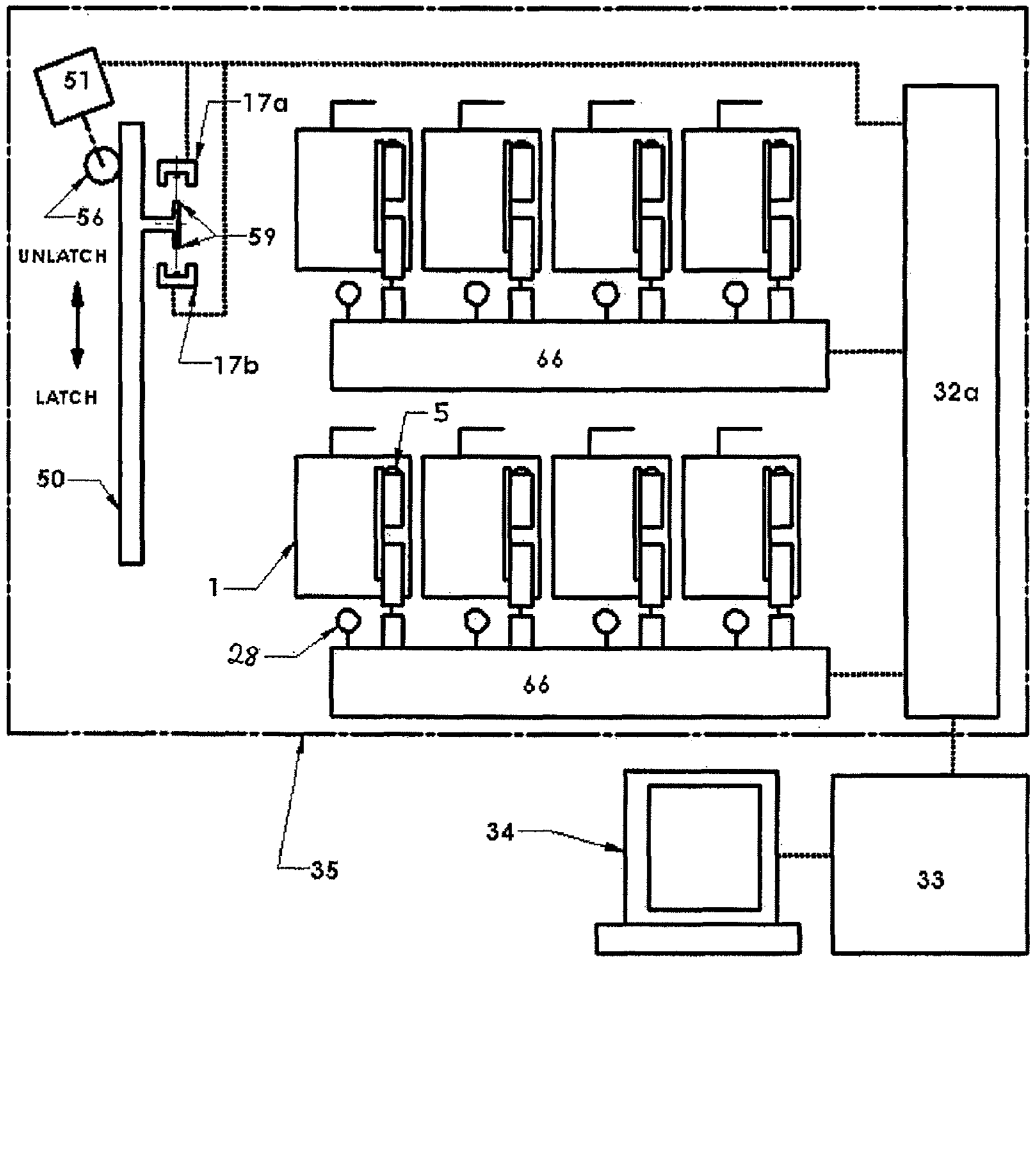
FIG. 20 shows a schematic of a plurality of receptacles in a tray assembly with a latch drive, according to certain embodiments disclosed.

As an illustrative example of a tray assembly with a latch mechanism, FIG. 20 shows a schematic of a plurality of receptacles 1 in a tray assembly 35, as shown in the embodiment illustrated in FIG. 1, but with the addition of a latch drive, comprising rod 50, motor 51, gear train 56, flag feature 59, and light beam sensors 17*a* and 17*b*. This schematic shows an additional tray circuit 32*a* that interfaces with the latch drive and to tray row circuits 66 for each row of receptacles 1. Also shown are the insertion placement indicators 28, which, in this embodiment, are connected to the row circuits 66 for indication of the proper receptacle insertion location. Removal indicators 5 are provided in a similar manner to the embodiment shown in FIG. 1.

Figure 21A:
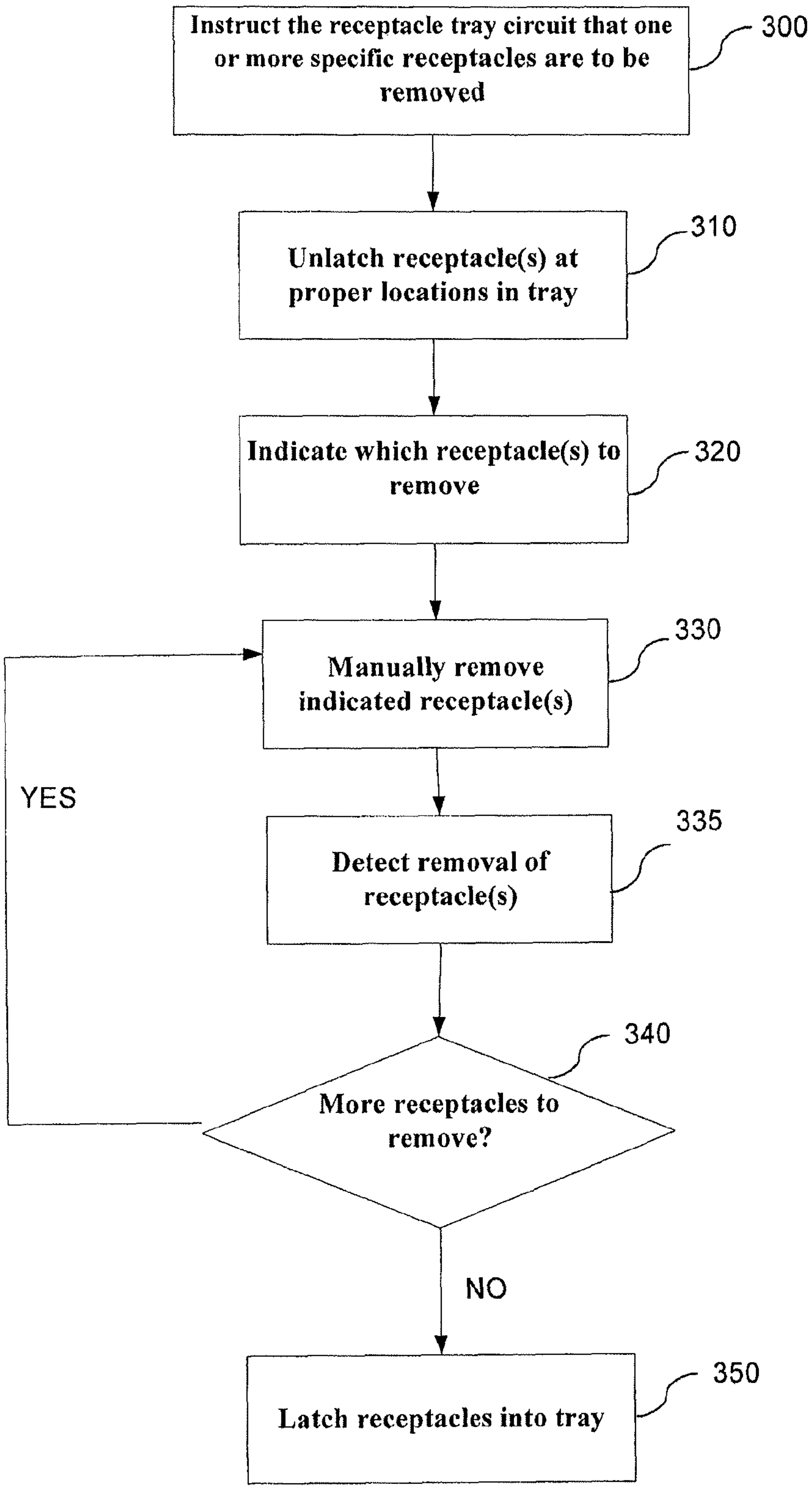
FIGS. 21(*a*) and 21(*b*) are flowcharts illustrating a method of simultaneously unlatching and simultaneously latching one or more receptacles, according to certain embodiments disclosed.
Figure 21B:
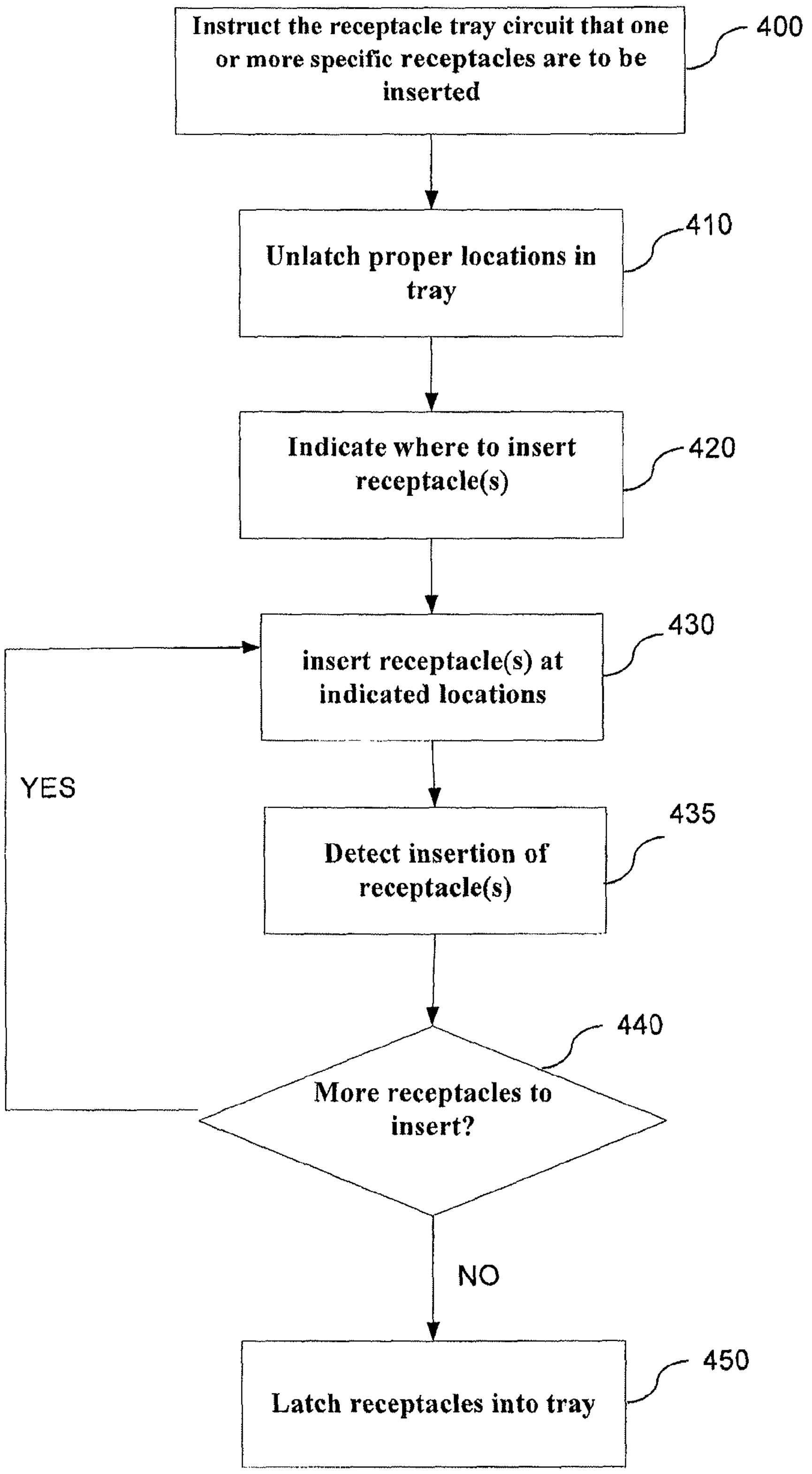

FIGS. 21(*a*) and 21(*b*) are flowcharts illustrating a method of simultaneously unlatching and simultaneously latching one or more receptacles according to disclosed embodiments after a user has requested removal or insertion, respectively, of one or more receptacles 1 through the user interface 34, as described at steps 200 to 205 of FIG. 2 for example. Referring to FIG. 21(*a*), at step 300 the processor 33 instructs the receptacle tray circuit 32*a* that one or more specific receptacles 1 are to be removed.

From step 300, the process proceeds to step 310 where the receptacle tray circuit 32*a* energizes the motor 51 which drives the rod 50 in the unlatch direction until flag 59 interrupts the light beam sensor 17*b*, at which point the motor 51 is deactivated. From operation 310, the process moves to step 320 where the receptacle tray circuit 32*a*, for example, signals the appropriate row circuit 66 to turn on the proper removal indicator 5 or placement indicator 28.

From step 320, the process proceeds to step 330 where the user removes the indicated receptacle 1*a*, using the gripping feature 4 on the receptacle 1*a*, as described above, or inserts one or more receptacles 1. The receptacle tray circuit 32*a* detects the removal of the receptacle(s) 1 by the loss of continuity between the receptacle tray circuit 32*a* and the row circuit 66. The receptacle tray circuit 32*a* deactivates the removal indicator 5 or the placement indicator 28 and may, according to certain embodiments, transmit a message to the processor 33 that the receptacle 1 has been removed or inserted (i.e., added).

From step 330, the process proceeds to step 335 where removal of the receptacle(s) 1 is detected. Here, according to certain embodiments, it may be determined whether the proper receptacle(s) 1 were removed, as described with reference to step 240 of FIG. 2. If the proper receptacle(s) 1 were removed, the removal indicators at the location of the receptacle(s) 1 may be deactivated. If an improper receptacle 1 was removed, the process may proceed to steps 270 and 280, of FIG. 2, where a message is transmitted to inform a processor that an improper receptacle 1 has been removed and indicators may be used to indicate the location(s) of the improperly removed receptacle(s) 1.

The process proceeds to step 340 where the processor 33 determines if there are any more receptacles 1 to be removed to the receptacle tray 2. If not, the process moves to step 350 where the motor 51 operates to re-latch the receptacle(s) 1 in the receptacle tray 2 until the flag 59 interrupts the sensor 17*a*, at which point the motor is deactivated. At this point, according to certain embodiments, the processor 33 completes the transaction with the user via the user interface 34, for example. The process may additionally transmit a message to a processor informing that the receptacle(s) 1 have been removed, as described with reference to step 260 of FIG. 2.

FIG. 21(*b*) shows a method of simultaneously unlatching and simultaneously latching one or more receptacles according to disclosed embodiments after a user has requested insertion of one or more receptacles 1 into tray 2. Referring to FIG. 21(*b*), at step 400 the processor 33 instructs the receptacle tray circuit 32*a* that one or more specific receptacles 1 are to be inserted (i.e., added to the receptacle tray 2).

From step 400, the process proceeds to step 410 where the receptacle tray circuit 32*a* energizes the motor 51 which drives the rod 50 in the unlatch direction until flag 59 interrupts the light beam sensor 17*b*, at which point the motor 51 is deactivated, in order to unlatch the proper locations of the receptacle(s) 1 to be inserted. From operation 410, the process moves to step 420 where the receptacle tray circuit 32*a*, for example, signals the appropriate row circuit 66 to turn on a placement indicator 28.

From step 420, the process proceeds to step 430 where the user inserts the indicated receptacle 1*a*, using the gripping feature 4 on the receptacle 1*a*, as described above, or inserts one or more receptacles 1. The receptacle tray circuit 32*a* detects the insertion of the receptacle(s) 1 by the continuity between the receptacle tray circuit 32*a* and the row circuit 66. The receptacle tray circuit 32*a* deactivates the placement indicator(s) 28 and may, according to certain embodiments, transmit a message to the processor 33 that the receptacle 1 has been inserted (i.e., added).

From step 430, the process proceeds to step 435 where removal of the receptacle(s) 1 is detected. Here, according to certain embodiments, it may be determined whether the proper receptacle(s) 1 were removed, as described with reference to step 240 of FIG. 2. If the proper receptacle(s) 1 were removed, the placement indicator(s) 28 at the location of the receptacle(s) 1 may be deactivated. If a receptacle 1 was inserted in an inappropriate location, the process may proceed to steps 270 and 280, of FIG. 2, where a message is transmitted to inform a processor that an improper receptacle 1 has been inserted in a specified location and indicators may be used to indicate the location(s) of the improperly inserted receptacle(s) 1.

The process proceeds to step 440 where the processor 33 determines if there are any more receptacles 1 to be added to the receptacle tray 2. If not, the process moves to step 450 where the motor 51 operates to re-latch the receptacle(s) 1 in the receptacle tray 2 until the flag 59 interrupts the sensor 17*a*, at which point the motor is deactivated. At this point, according to certain embodiments, the processor 33 completes the transaction with the user via the user interface 34, for example. The process may additionally transmit a message to a processor informing that the receptacle(s) 1 have been inserted, as described with reference to step 260 of FIG. 2.

Figure 22:
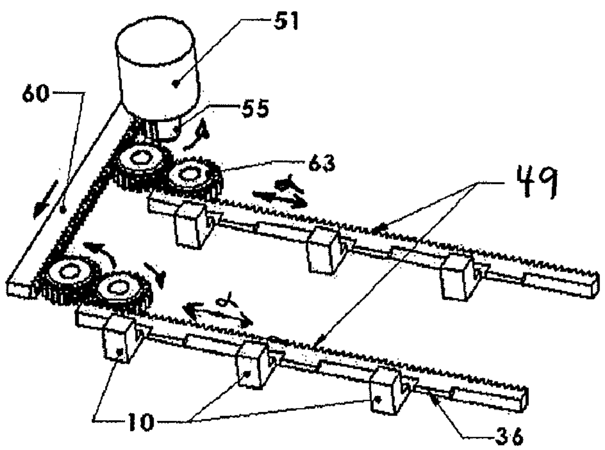
FIGS. 22(*a*), 22(*b*) and 22(*c*) show alternate means for performing a multi-latch function, according to certain embodiments disclosed.
Figure 22B:
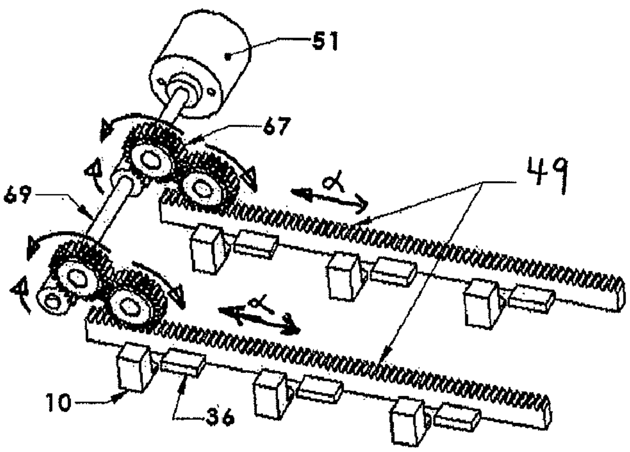
Figure 22C:
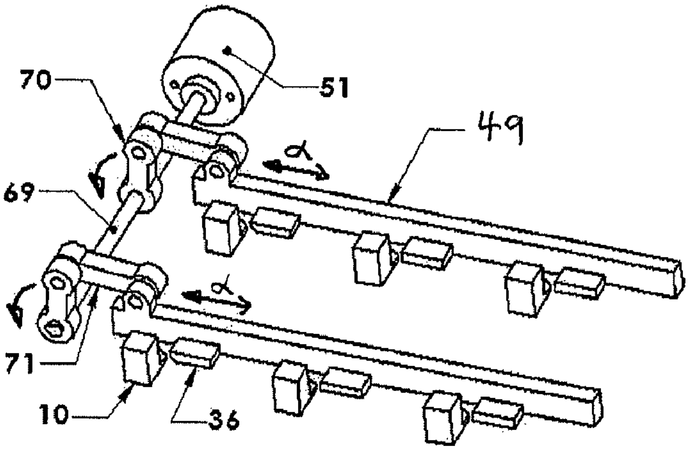

FIGS. 22(*a*), 22(*b*) and 22(*c*) show alternate embodiments for performing the multi-latch function described herein, using a motor 51. For example, FIG. 22(*a*) uses gear teeth on the driving rod 60 to drive the latch sliders 49 through a gear train 63 so that latch sliders 49 slide along arrow α in a latch and unlatch directions. As described above with reference to FIGS. 18 and 19, motor 51 and gear train 55 actuate driving rod 60, which in turn actuates the latch sliders 49 to cause latching and unlatching between hooks 10 and latching elements 36.

FIG. 22(*b*) shows the latch sliders 49 being driven by rotating shaft 69, actuated by the motor 51, through a gear train 67. The latch sliders 49 slide along arrow α in a latch and unlatch direction to cause latching and unlatching, respectively, by engaging and disengaging hooks 10 and latching elements 36.

FIG. 22(*c*) shows the gear train replaced by a crank mechanism, with cranks 70, actuated by rotating shaft 69 actuated by the motor 51, and crank arms 71, which drives sliders 49 which slides along arrow α in a latch and unlatch direction to engage and disengage, respectively, latching elements 36 and hooks 10. The disclosed embodiments of the multi-latch mechanism and similar mechanisms could be employed.

Additional configurations of the receptacles 1 and receptacle tray 2 may be used. For example, the receptacle connector 21 and the tray connector 20 may be mated horizontally, and/or the hook feature may be formed on the back of the receptacle 1 to provide a lower profile. In this case, the latching mechanisms described above could still be implemented.

Figure 23:
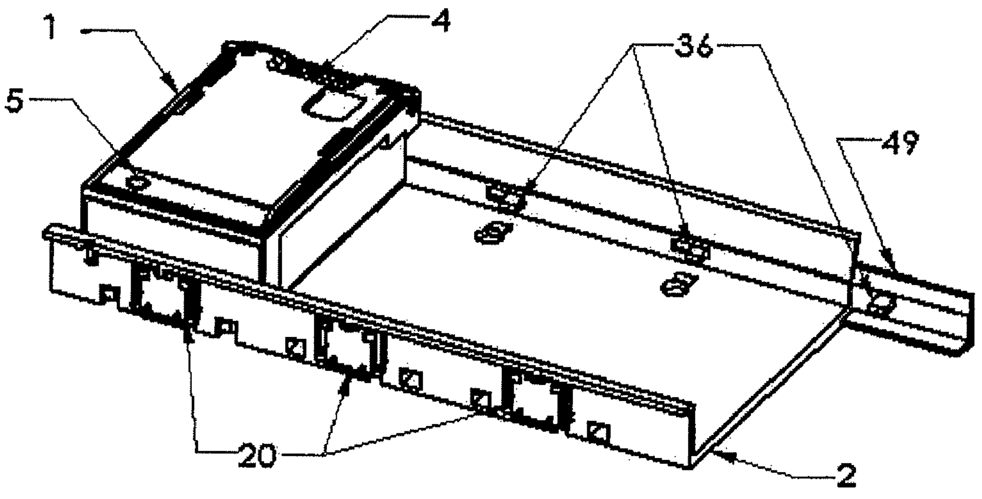
FIG. 23 shows an orientation for a latch mechanism that allows for a lower profile assembly, according to certain embodiments disclosed.

FIG. 23, for example, shows an alternate orientation for the latch that allows for a lower profile assembly. The latching elements 36 are along the side of the receptacle tray 2, such that the latching elements 36 would engage the hook(s) 10 at the back of the receptacles 1. Moreover, according to certain embodiments, tray connector 20 would contact receptacle connector 21 at the front of the receptacle 1.

Figure 24:
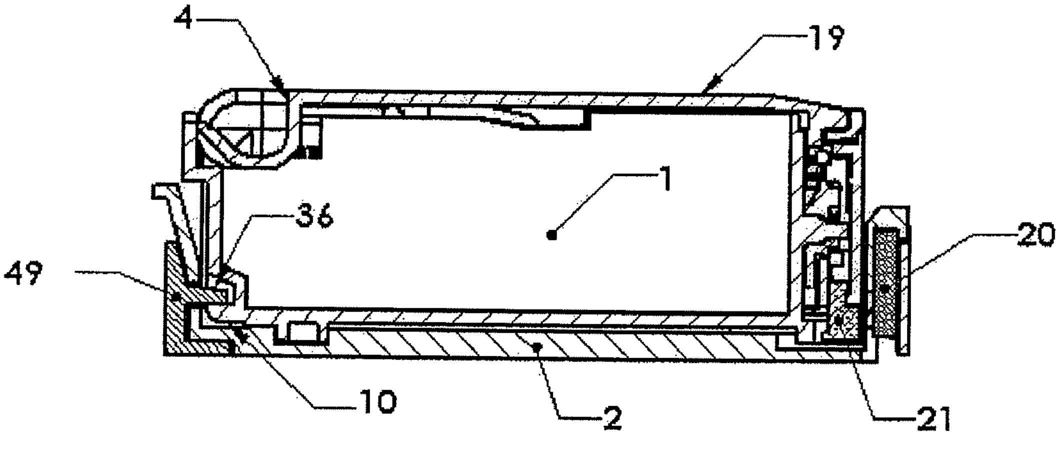
FIG. 24 shows a section view of a receptacle that allows for a lower profile assembly, according to certain embodiments disclosed.

FIG. 24 shows a section view of the receptacle 1 that would fit into the tray configuration shown in FIG. 23. Hook 10 protrudes from the back of the receptacle 1, while connector 21 is positioned so as to contact tray connector 20 from the front of the receptacle 1.

Cooperating mechanical features of the receptacles and trays provide a reliable arrangement for inserting receptacles into trays and provide exceptionally accurate control of the relative position of the receptacle within the tray, particularly in the vicinity of the connector interface, resulting in a reliable electrical connection. These features also limit the amount of free motion at the connector when the receptacle is seated.

Further, by indicating which receptacles to remove and manually removing the indicated receptacles via a gripping mechanism, a consistent and reliable electrical connection between the receptacle and the tray will be maintained over a longer period of time, while providing the capability of easily reconfiguring the receptacles within trays and securely transporting items within the receptacles.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for removably securing receptacles, the system comprising:

a plurality of receptacles each comprising:

a first electrical connector; and a removal indicator coupled to the first electrical connector;

a tray configured to receive the receptacles in rows, the tray comprising:

a plurality of second electrical connectors configured to mate with the first electrical connector when a receptacle is received in the tray;

a latch slider configured to selectably simultaneously latch and unlatch a row of receptacles; and a tray circuit coupled to the latch slider and to the removal indicator through the respective first and second electrical connectors, the tray circuit configured to activate the removal indicator and to cause the latch slider to unlatch the row of receptacles upon receipt of a first signal.

2. The system of claim 1, wherein the tray circuit is further configured to deactivate the removal indicator and to cause the latch slider to latch the row of receptacles upon receipt of a second signal.

3. The system of claim 1, wherein the receptacle further comprises a receptacle circuit coupled to the first electrical connector and the tray circuit is further configured to determine that a receptacle has been removed from the tray by detecting the loss of continuity between the tray circuit and the receptacle circuit through the first and second connectors.

4. The system of claim 3, wherein the tray circuit is further configured to provide a third signal when a receptacle has been removed from the tray.

5. The system of claim 3, wherein the first signal comprises an identification of the receptacle to be removed and the tray circuit is further configured to provide a fourth signal when a receptacle other than the identified receptacle is removed.

6. The system of claim 3, wherein the receptacle further comprises:

a body;

a lid movably coupled to the body, the lid and body configured to form an enclosed volume, the lid having a closed position wherein the volume is not accessible and an open position where the volume is accessible; and a lid latch coupled to the body and to the receptacle circuit, the lid latch configured to selectably secure the lid in the closed position and release the lid to move between the closed and open positions;

wherein the receptacle circuit is further configured to cause the lid latch to release the lid and the tray circuit is further configured to send a command to the receptacle circuit to release the lid upon receipt of a fifth signal.

7. The system of claim 1, wherein:

the tray further comprises a plurality of insertion placement indicators coupled to the tray circuit, each insertion placement indicator associated with a location at which a receptacle can be received;

the first signal comprises a location where a receptacle is to be received; and the tray circuit is further configured to activate the insertion placement indicator upon receipt of the first signal.

8. The system of claim 7, wherein the tray circuit is further configured to detect the receipt of a receptacle in the location indicated by the insertion placement indicator.

9. A method for controlling removal of one or more receptacles from a tray, the method comprising the steps of:

energizing a single actuator to disengage a latch slider from a plurality of hooks respectively coupled to a plurality of receptacles;

activating a removal indicator associated with a receptacle that is to be removed; and allowing the receptacle associated with the at least one activated removal indicator to be removed.

10. The method of claim 9, further comprising the steps of:

detecting the removal of the receptacle associated with the activated removal indicator; and transmitting a message to a processor that the receptacle associated with the activated removal indicator has been removed.

11. The method of claim 10, further comprising the steps of:

deactivating the activated removal indicator; and energizing a single actuator to engage the latch slider with the hooks respectively coupled to the plurality of receptacles.

12. The method of claim 10, further comprising the steps of:

detecting the removal of a receptacle other than the receptacle associated with the activated removal indicator; and transmitting a message to the processor that a receptacle other than the receptacle associated with the activated removal indicator has been removed.

* * * * *